3,404,186
Patented Oct. 1, 1968

3,404,186
RECOVERY OF ETHANOL FROM A METHYL ETHYL KETONE-ETHYL ACETATE FRACTION SUCH AS PRODUCED BY HYDROCARBON OXIDATION
Walton W. Bailey, Edward P. Maglaughlin, and William H. Nichols, Pampa, Tex., assignors to Celanese Corporation, New York, N.Y., a corporation of Delaware
No Drawing. Filed Feb. 7, 1966, Ser. No. 525,360
10 Claims. (Cl. 260—593)

ABSTRACT OF THE DISCLOSURE

A fraction comprising methyl ethyl ketone and ethyl acetate is resolved into separate components including ethanol and methyl ethyl ketone by a method which comprises hydrolyzing the fraction; recovering from the hydrolysis product a mixture comprising ethanol and methyl ethyl ketone; adding water to the mixture; and extracting with a hydrocarbon whereby the methyl ethyl ketone is recovered in the extract and the ethanol in the raffinate. A particularly useful embodiment is application of the method to the recovery of ethanol from a methyl ethyl ketone-ethyl acetate fraction produced in the liquid-phase oxidation of hydrocarbons such as butane; in this embodiment the methyl ethyl ketone in the extract can be recycled to the liquid-phase oxidation reaction system as desired.

---

This invention relates to the manufacture of ethanol.

More particularly it relates to the manufacture of ethanol from a fraction which can be produced by the liquid phase oxidation of hydrocarbons with molecular oxygen. Specifically it relates to the manufacture of ethanol, methyl ethyl ketone, and acetic acid by withdrawing and subjecting to a particular separation technique a fraction hitherto employed as an internal recycle in hydrocarbon oxidation plants.

Heretofore the liquid phase oxidation of aliphatic hydrocarbons with molecular oxygen has been employed primarily as a means for producing carboxylic acids. For example, the liquid phase oxidation of hydrocarbons containing from three to about six carbon atoms has been employed in the production of acetic, propionic, and butyric acids. There is some production of byproduct materials, such as acetone, but a commercially satisfactory means for producing ethanol by hydrocarbon oxidation has not heretofore been known. Instead, ethanol has generally been produced either by fermentation or by the hydration of ethylene. Neither of these methods is attractive in a plant which is based upon hydrocarbon raw materials but which does not include facilities for producing ethylene. Heretofore, whenever ethanol was needed in such a plant, as, for example, for the production of ethyl esters, it has been necessary to purchase the ethanol from other sources. This is both inconvenient and, especially in terms of shipping expense, costly.

It is an object of this invention to provide a method for manufacturing ethanol as a co-product from the liquid phase oxidation of aliphatic hydrocarbons.

It is a further object to provide a method for recovering methyl ethyl ketone in salable form while producing ethanol as above.

It is an additional object to provide a method for separating a fraction comprising methyl ethyl ketone and ethyl acetate into useful individual components, including ethanol and methyl ethyl ketone.

Other objects of the invention will be apparent from the following detailed description and claims.

In accordance with the present invention ethanol, methyl ethyl ketone, and acetic acid are produced by the withdrawal and processing of at least a portion of a particular fraction which has hitherto been employed as an internal recycle to the oxidation system in hydrocarbon oxidation plants.

The fraction referred to above is a mixture comprising methyl ethyl ketone and ethyl acetate. Lesser quantities of other compounds may be present, but their disposition is outside the scope of the invention. This fraction is recovered in the course of recovering salable products from the oxidation reaction product formed in the liquid phase oxidation of aliphatic hydrocarbons having approximately three to six carbon atoms, especially four to five carbon atoms. The oxidation product comprises unreacted hydrocarbon, various esters and ketones, and, most important commercially, carboxylic acids, especially acetic, propionic, and butyric. This product is normally separated into several fractions including (a) carboxylic acids, (b) by-product materials which may be sold or otherwise withdrawn from the system, (c) unreacted hydrocarbon, and (d) the fraction comprising methyl ethyl ketone and ethyl acetate with which this invention is concerned. Of these fractions, that containing unreacted hydrocarbon is, as would be expected, recycled to the oxidation reactor for further oxidation. The ethyl acetate-methyl ethyl ketone fraction is also generally recycled to the oxidation reactor, although a small portion has sometimes been withdrawn for purification and utilization as a mixed ketone-ester solvent. The bulk of it is reoxidized, however, because (1) it yields salable carboxylic acids upon reoxidation, and (2) its resolution into anything other than a mixed solvent has been very difficult in the existing art, since the separation of methyl ethyl ketone from ethyl acetate requires an expensive water-extractive distillation. The recycle of this fraction to the oxidation reactor has drawbacks, however, one of which is that there is always at least some degradation to valueless materials such as carbon oxides and formic acid during reoxidation.

It has now been discovered that (a) this fraction can be resolved into desirable individual components without employing extractive distillation if it is first hydrolyzed so as to convert the ethyl acetate into ethanol and acetic acid, and (b) a very substantial production of ethanol and methyl ethyl ketone can be realized by withdrawing and hydrolyzing this fraction or a portion thereof followed by separation of the hydrolized material into its separate components. Not only does the withdrawal and hydrolysis of this fraction result in the production of substantial quantities of ethanol and methyl ethylketone, but it also results in an increase in the net conversion of hydrocarbons to methyl ethyl ketone and ethoxy moiety, as a result of re-equilibration reactions occurring in the oxidation step as a result of the withdrawal of this recycle stream from the reactor feedstock. The net result of the application of this invention to a hydrocarbon oxidation plant is the production of ethanol in unexpected quantities. Concomitantly, the production of methyl ethyl ketone, free of ethyl acetate contaminant, also results. The methyl ethyl ketone, or a portion thereof, can be recycled to the oxidation reactor if desired to convert it further to other useful materials, e.g. acetic acid.

One particular embodiment of the invention is a process for the separation of methyl ethyl ketone from a mixture of methyl ethyl ketone and ethyl acetate, regardless of whether the mixture is derived from a hydrocarbon oxidation process.

In carrying out the process of the invention in a hydrocarbon oxidation plant, a fraction containing methyl ethyl ketone and ethyl acetate is recovered from the crude product obtained from the oxidation reactor, by methods which are outside the scope of the invention but which typically comprise distillation. Any desired portion of this fraction, or none at all if desired, is returned to the oxidation reaction system, and the remainder is mixed with a quantity of water at least equal to, and preferably in excess of, that stoichiometrically required for the hydrolysis of the ester portion of the fraction. The resulting mixture is then subjected to hydrolysis in the presence of a suitable catalyst. The molar ratio of water to ester employed in the hydrolysis is advantageously about one to ten moles of water per mole of ester moiety; preferably about 1.0 to 7.0. Some hydrolysis will result when the molar ratio is less than 1.0, but a stoichiometric excess of water is preferred.

Any acidic catalyst system suitable for the hydrolysis of esters may be employed in the hydrolysis, but acidic ion exchange resin catalysts are preferred as being economical, efficient, and requiring a minimum of processing equipment. The conditions of temperature, pressure, and reaction time to be employed are not critical, although the conditions to be described in the example included herein are practical and recommended. The hydrolysis may be conducted batchwise or continuously, but a continuous operation is preferred.

The separation and recovery of the hydrolysis products can be accomplished by a number of methods, but in accordance with the present invention the initial step is a distillation whereby the acetic acid and most of the excess water are removed as a residue stream. The acetic acid is recovered from this stream by conventional methods, such as extraction and distillation. The distillate stream from this initial distillation, containing unhydrolyzed ethyl acetate, the methyl ethyl ketone, and the ethanol, is then fed to a second distillation step in which low-boiling impurities and unhydrolyzed ethyl acetate are removed as a distillate comprising a ternary azeotrope of methyl ethyl ketone, water, and ethanol. The residue from this second distillation step, containing methyl ethyl ketone and ethanol, is then mixed with water and extracted with a suitable selective solvent, such as a hydrocarbon and particularly pentane, to separate the methyl ethyl ketone from the ethanol. From this extraction the ethanol is recovered in the raffinate phase while the methyl ethyl ketone is recovered in the extract. The separation and purification of ethanol from the extract and methyl ethyl ketone from the raffinate are accomplished by conventional methods, primarily distillation, which are well known to those skilled in the art. The purification procedures to be employed in a given instance will depend upon the nature of the impurities existing in a given hydrolysis product, especially their volatilities and concentrations.

The present invention is not limited to any one scheme of product purification. It will also be understood that in many such distillation systems it may be found expedient to withdraw and recycle various materials. For example, in the present invention, it may be found expedient to allow a fraction of the methyl ethyl ketone to enter the ethanol purification system, from which it is later withdrawn and returned to the extraction step.

The following example is given to illustrate the invention further.

EXAMPLE I

Through a vessel packed with 100 cubic feet of an acidic ion exchange catalyst there is continuously passed 650 pounds per hour of liquid water mixed with 2200 pounds per hour of a liquid fraction containing 1512 pounds of methyl ethyl ketone, 273 pounds of ethyl acetate, 144 pounds of ethanol, and 271 pounds of other oxygenated derivatives of aliphatic hydrocarbons. The catalyst is a sulfonated polystyrene ion exchange resin, specifically "IR–120" manufactured by Rohm and Haas Company. The catalyst is employed in the hydrogen form. The vessel containing the catalyst, i.e. the hydrolysis reactor, is maintained at a temperature of 138° F. and a pressure of 43 pounds per square inch absolute. Temperature is controlled, and mixing is promoted, in the hydrolysis reactor by circulating 1000 pounds per hour from the discharge end of the reactor back to its inlet end through a steam-heated heat exchanger. The reactor is a vertical cylindrical vessel of approximately 150 cubic feet capacity containing the ion exchange resin packed upon a suitable supporting screen. Flow through the reactor is upward but can be downward if desired.

From the reactor there are drawn off per hour 2850 pounds of a hydrolysis product containing 1512 pounds of methyl ethyl ketone, 110 pounds of ethyl acetate, 234 pounds of ethanol, 112 pounds of water, 271 pounds of other organic compounds, and 611 pounds of water. The hydrolysis product is then fed to the 21st tray from the bottom of a distillation tower having 40 trays and operating at a temperature of 158° F. and at a pressure of 13 pounds per square inch absolute (measured at the top), with a reflux ratio of 1.0 to 1. From the base of this tower there is withdrawn a residue comprising 112 pounds per hour of acetic acid and 470 pounds per hour of water. This residue is forwarded to separate facilities for the recovery of the acetic acid by conventional methods, i.e. solvent extraction and distillation.

As distillate from the top of the aforementioned tower are recovered 2268 pounds per hour of a mixture containing 1512 pounds per hour of methyl ketone, 110 pounds per hour of ethyl acetate, 234 pounds per hour of ethanol, 271 pounds per hour of other organic compounds, and 141 pounds per hour of water. This distillate is mixed with 61 pounds per hour of a recycle stream containing 20 pounds of methyl ethyl ketone, 10 pounds of ethanol, 25 pounds of other organic compounds, and 6 pounds of water (this recycle stream resulting from the ethanol purification operation to be mentioned below), and the resulting mixture is fed to a second distillation tower having 60 trays and operating at 153° F. and 13 pounds per square inch absolute, measured at the top, with a reflux ratio of 20 to 1. From this second tower there is withdrawn a distillate stream containing 102 pounds per hour of methyl ethyl ketone, 90 pounds per hour of ethyl acetate, 18 pounds per hour of ethanol, 94 pounds per hour of other organic compounds, and 27 pounds per hour of water. This distillate stream contains most of the unhydrolyzed ethyl acetate as a ternary azeotrope. It is important that as much as possible of the ethyl acetate be removed at this point. This distillate stream can be recycled to the hydrolysis reactor, preferably after first removing as much as possible of the 94 pounds of other organic compounds by suitable methods, such as distillation. The residue from the aforementioned second column contains 1430 pounds per hour of methyl ethyl ketone, 20 pounds per hour of ethyl acetate, 226 pounds per hour of ethanol, 202 pounds per hour of other organic compounds, and 120 pounds per hour of water. It is mixed with 418 pounds per hour of a stream consisting primarily of water, is cooled to 89° F., and is then fed to the top of an extraction tower having 10 stages, in which it is extracted countercurrently with 300 pounds per hour of pentane which is injected into the bottom of the extraction tower. The extraction tower is maintained at approximately 87° F. and 43 pounds per square inch absolute.

The extract withdrawn from the top of the pentane extraction tower contains 1410 pounds per hour of methyl ethyl ketone, 20 pounds per hour of ethyl acetate, and 3166 pounds per hour of other materials, predominantly pentane. The raffinate recovered from the pentane extractor contains 226 pounds per hour of ethanol, 20 pounds per hour of methyl ethyl ketone, 52 pounds per hour of other organic compounds, and 520 pounds per hour of water. The extract is separated, by conventional methods, into pentane (which is recycled to the extraction tower) and crude methyl ethyl ketone, which is purified by conventional methods outside the scope of the present invention to produce 300 pounds of purified methyl ethyl ketone for sales purposes and 1095 pounds of unpurified methyl ethyl ketone for internal plant uses, including recycle to the hydrocarbon oxidation reaction system from which the fraction fed to the hydrolysis reactor is originally derived.

The raffinate from the extraction tower described above is fed to a distillation system consisting of two towers. From the first of these a residue stream comprising largely water and minor amounts of organic compounds is withdrawn for recycle to the hydrolysis reaction system, while a distillate comprising crude ethanol is passed to a second tower. From the second tower a residue stream consisting of 216 pounds per hour of ethanol, 7 pounds per hour of other organic materials, and 22 pounds per hour of water is recovered as product, while a distillate stream comprising about 61 pounds per hour of organics including 20 pounds per hour of methyl ethyl ketone and 10 pounds per hour of ethanol is returned as recycle to the second tower employed in the initial separation of the hydrolysis reaction product.

There are many possible variations in the product recovery scheme, particularly after the initial separation of methyl ethyl ketone from ethanol has been accomplished. Likewise there are many posible variations in the manner of conducting the hydrolysis reaction. Acidic ion exchange catalysts other than that described in the foregoing example can be employed successfully, in fixed beds, moving beds, and slurries, and strong acids can be employed in place of the ion exchange catalyst. For example, aqueous sulfuric acid, phosphoric acid, and aryl sulfonic acids can all be employed. The hydrolysis reaction temperature is not critical, but a temperature range of 86 to 158° F. is practicable with 130 to 140° F. being preferred. Difficulty due to thermal degradation of ion exchange resins presently commercially available can be minimized by operating at a temperature of below about 158° F. As resins of higher thermal stability become available, the hydrolysis temperature can advantageously be increased accordingly. The hydrolysis pressure is not critical at all so long as it is high enough to keep the liquid reactants in the liquid phase at the chosen hydrolysis reaction temperature. Reaction time, or the ratio of catalyst volume to reactor throughput, is not critical. However, for hydrolysis systems based on the use of an acidic ion exchange resin catalyst at reaction temperatures of about 130 to 140° F., it is preferred to operate with about 1.5 to 2.0 cubic feet of catalyst per cubic feet of reactor liquid throughput per hour. Increased ratios of catalyst bed volume to reactor throughput have no deleterious effect and will in fact tend to increase the conversion obtained per pass. Decreased ratios will tend to lower somewhat the conversion per pass obtained in the hydrolysis reaction, but operation in such a manner is still possible by recycling the unhydrolyzed ethyl acetate.

Thorough mixing of the hydrolysis feedstock fraction with the water employed in the hydrolysis is desirable in order to avoid the formation of two phases (aqueous and non-aqueous). This can be accomplished in a number of ways, but it has been found effective to blend the water and the feedstock fraction into a circulating loop pumped from the hydrolysis reactor outlet, through a heat exchanger employed in maintaining the reactor temperature, and back into the reactor inlet.

The invention is not limited to the processing of a feedstock fraction identical in composition with that described in the foregoing example, which is a particular fraction derived from a particular hydrocarbon oxidation process operating under particular conditions. Obviously the process is also applicable to the separation of fractions containing only methyl ethyl ketone and ethyl acetate with no third component. Likewise, it is effective with feedstocks containing widely varying ratios of methyl ethyl ketone to ethyl acetate. In particular it has applications with feedstocks in which the ratio of ethyl acetate to methyl ethyl ketone is much higher than in the feedstock fraction described in the example. The greater the ratio of ethyl acetate to methyl ethyl ketone in the hydrolysis feedstock, the greater is the production of ethanol realized by the process of the invention.

It is to be understood that the foregoing detailed description is merely given by way of illustration and that many variations may be made therein without departing from the spirit of our invention.

The embodiments of the invention in which an exclusive property or privilege is claimed are defined as follows:

1. A process for separating into useful individual components a fraction comprising methyl ethyl ketone and ethyl acetate, which process comprises mixing water with said fraction; bringing the resulting mixture in the liquid phase into contact with an acidic hydrolysis catalyst; hydrolyzing at least a portion of the ethyl acetate content of said fraction to form a hydrolysis product comprising methyl ethyl ketone, ethanol, acetic acid, water, and unhydrolyzed ethyl acetate; distilling said hydrolysis product to separate said hydrolysis product into a fraction comprising acetic acid and water, a fraction comprising ethyl acetate, and a fraction comprising methyl ethyl ketone and ethanol; mixing water with said fraction comprising methyl ethyl ketone and ethanol to form an aqueous solution thereof; and extracting said aqueous solution with a hydrocarbon to produce an extract containing said methyl ethyl ketone and a raffinate containing said ethanol.

2. A process as described in claim 1 wherein the hydrolysis catalyst is an acidic ion-exchange resin.

3. A process as described in claim 1 wherein the distillation of the hydrolysis product comprises the steps of distilling said hydrolysis product to produce a residue stream comprising acetic acid and water and a distillate comprising methyl ethyl ketone, ethanol, and ethyl acetate; and redistilling said distillate to produce an overhead stream comprising ethyl acetate and a residue stream comprising methyl ethyl ketone and ethanol.

4. A process as described in claim 1 wherein the recovery of methyl ethyl ketone and ethanol from the redistillation residue stream comprises mixing water with said residue stream to form an aqueous solution; extracting said aqueous solution with a hydrocarbon to produce an extract containing the methyl ethyl ketone and a raffinate containing the ethanol; comprising the additional steps of recovering methyl ethyl ketone from the extract and recovering ethanol from the raffinate.

5. A process as described in claim 1 wherein the hydrocarbon is pentane.

6. In a process for manufacturing oxygenated derivatives of hydrocarbons by reacting a hydrocarbon with molecular oxygen in a liquid-phase oxidation system to form a crude reaction product comprising carboxylic acids, ethyl acetate, and methyl ethyl ketone: the improvement which comprises recovering from said reaction product a fraction comprising methyl ethyl ketone and ethyl acetate; mixing water with said fraction; bringing the resulting mixture into contact with an acidic hydrolysis catalyst; hydrolyzing at least a portion of the ethyl acetate content of said fraction to form a hydrolysis product comprising methyl ethyl ketone, ethanol, acetic acid, water, and unhydrolyzed ethyl acetate; recovering a mixture comprising predominantly ethanol and methyl ethyl ketone from said hydrolysis product by distillation; separating said ethanol from said methyl ethyl ketone by mixing water with said mixture of ethanol and methyl ethyl ketone to form an aqueous solution thereof followed by extracting said aqueous solution with a hydrocarbon to produce an extract containing said methyl ethyl ketone and a raffinate containing said ethanol; recovering said ethanol from said raffinate; and returning up to 100% of said methyl ethyl ketone to said liquid-phase oxidation system as a recycle stream.

7. A process as described in claim 6 wherein said hydrolysis catalyst is an acidic ion-exchange resin.

8. A process as described in claim 6 wherein the recovery of said mixture comprising predominantly ethanol and methyl ethyl ketone from the hydrolysis product comprises the steps of distilling said hydrolysis product to produce a residue stream comprising acetic acid and water and a distillate comprising methyl ethyl ketone, ethanol, and ethyl acetate; and redistilling said distillate to produce an overhead stream comprising ethyl acetate and a redistillation residue comprising methyl ethyl ketone and ethanol, said residue constituting said recovered mixture.

9. A process as described in claim 6 wherein the hydrocarbon is pentane.

10. A process as described in claim 6 including the additional step of recovering at least a portion of said methyl ethyl ketone from said extract.

References Cited

FOREIGN PATENTS 501,374  4/1954  Canada.

DANIEL D. HORWITZ, *Primary Examiner*.